United States Patent [19]
Lahme et al.

[11] 3,940,348

[45] Feb. 24, 1976

[54] REACTION CATALYST FOR THE ELIMINATION OF OXYHYDROGEN GAS IN LEAD-ACID STORAGE BATTERIES

[75] Inventors: Norbert Lahme, Hoppecke; Gunter Sassmannshausen, Brilon, both of Germany

[73] Assignee: Accumulatorenwerk Hoppecke, Cologne, Germany

[22] Filed: Mar. 15, 1973

[21] Appl. No.: 341,577

[30] Foreign Application Priority Data
Mar. 18, 1972  Germany............................ 2213219

[52] U.S. Cl.......... 252/466 PT; 252/472; 252/477 R
[51] Int. Cl.$^2$...................... B01J 21/04; B01J 23/56
[58] Field of Search........... 252/466 PT, 477 R, 472

[56] References Cited
UNITED STATES PATENTS

| | | | |
|---|---|---|---|
| 2,016,135 | 10/1935 | Cummings ...................... | 252/456 X |
| 2,742,437 | 4/1956 | Houdry .......................... | 252/477 R |
| 3,038,954 | 6/1962 | Pattison et al. .................... | 136/179 |
| 3,174,881 | 3/1965 | McEvoy et al.................. | 252/477 R |
| 3,379,570 | 4/1968 | Berger et al. ..................... | 252/477 R |

FOREIGN PATENTS OR APPLICATIONS

| | | | |
|---|---|---|---|
| 949,436 | 2/1964 | United Kingdom ............. | 252/477 R |
| 960,263 | 6/1964 | United Kingdom ............ | 252/477 R |
| 759,953 | 8/1952 | Germany......................... | 252/477 R |
| 953,603 | 11/1956 | Germany......................... | 252/477 R |
| 1,517,993 | 2/1969 | Germany......................... | 252/477 R |
| 953,354 | 11/1956 | Germany ............................ | 136/179 |

*Primary Examiner*—W. J. Shine
*Attorney, Agent, or Firm*—Bacon & Thomas

[57] ABSTRACT

A reaction catalyst for the recombination of the oxyhydrogen gas produced by lead-acid storage batteries into water in a controlled, exothermic reaction, where the catalyst element is a solid rod element with a central heat conducting core, the catalyst rod being positioned inside a gas-tight housing in communication with the battery gas space. This rod element is produced by a fabricating method in which granular catalyst carrier material is worked into a paste which is then shaped and dried, the metallic catalyst being deposited on the surface of the carrier grains.

8 Claims, 4 Drawing Figures

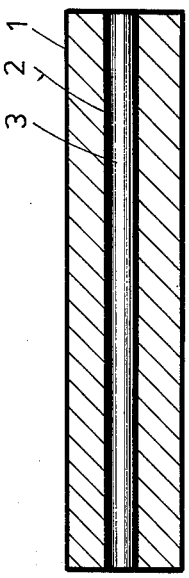
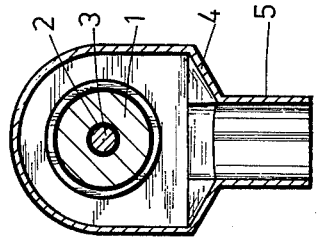
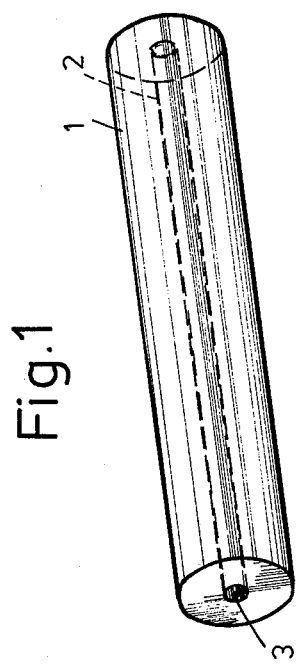
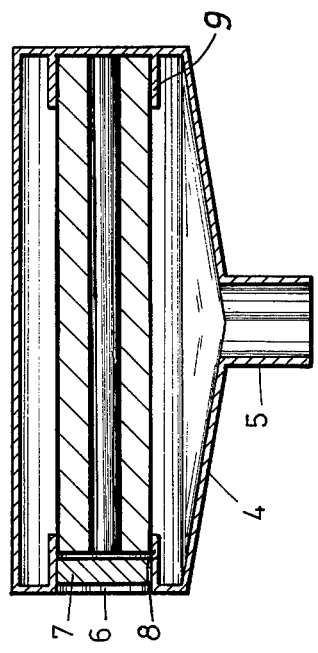

REACTION CATALYST FOR THE ELIMINATION OF OXYHYDROGEN GAS IN LEAD-ACID STORAGE BATTERIES

BACKGROUND OF THE INVENTION

1. Field of the Invention

The present invention relates to gas reaction catalysts, and in particular to catalysts for the recombination of the oxyhydrogen gas created by lead-acid storage batteries into water, the catalyst consisting essentially of a catalyst carrier material and an active metallic catalyst material of the platinum group arranged in or on the carrier material. The invention concerns itself with a method of producing such a catalyst and a device for the application of such catalysts in combination with storage batteries in the place of the normally used battery plug, in accordance with German patent application P 20 08 218.2.

2. Description of the Prior Art

Catalysts which are used for the control or acceleration of the speed of a chemical reaction, without being part of the end product obtained by the reaction, consist normally of a catalyst carrier material which is catalytically indifferent and of the catalyst material itself which is applied to the carrier or otherwise arranged on the carrier surface. Because the catalytic reaction takes place within a very thin surface layer of the catalyst material, and because the catalytic reaction is of a surface-chemical nature, a primary desire in the production of this type of catalyst is to obtain a maximum degree of dispersity of the catalyst material so as to obtain the greatest possible reaction surface. With a given chemical composition of the catalyst material itself, any improvement in the catalytic activity therefore can only be obtained through improved production and assembly methods which reflect themselves in the physical characteristics of the catalyst surface. For this reason, it has already been suggested to utilize pulverulent or granular carrier materials and similar granular catalyst materials and to thoroughly intermingle these materials. It has also been suggested to use porous carrier grains and to soak the latter with the active catalyst material. It is further known from the prior art to obtain the catalyst layer on the surface of pre-formed grains of the carrier material by precipitation.

Based on this general technological background, various attempts have already been made to achieve an effective recombination of the oxygen and hydrogen which is created in lead-acid storage batteries to obtain water which can be returned to the electrolyte of the battery, in order to reduce servicing requirements, and especially, to eliminate the frequent addition of distilled water to the electrolyte. For instance, there are commercially available so-called catalytic battery plugs which contain a catalyst arranged inside a housing which consists of a mixture of granular catalyst carrier material and granular activated catalyst material of the platinum group (German Pat. No. 953,354). This container is inserted in the place of a conventional battery plug into the particular battery opening, thereby exposing the catalyst to the atmosphere in the reaction space of the battery so as to recover water from the oxyhydrogen gas which is created during the operation of the storage battery.

However, the basic problem of the recombination of oxygen and hydrogen has not been satisfactorily solved by these catalytic battery plugs. Considerable difficulties have been encountered in connection with the fact that the catalytic reaction is highly exothermic and very difficult to control. It was found, for example, that conditions of very high specific loads on the catalyst surface may occur through the supply of comparatively large amounts of oxygen and hydrogen which cause a concentrated development of reaction heat within a small space consisting of only a few carrier grains which are in immediate contact with the oxyhydrogen gas. The entire grain accumulation of the catalyst-carrier mixture has a very poor heat conductivity, because of the small areas of contact between the grains. This shortcoming is very detrimental to the effective operation of the catalyst, due to the local overloading of the activated metal and carrier material which reduces the longevity of the catalyst. Applicants have in the past attempted to improve the catalyst-carrier mixture by depositing the catalytically active metal such as palladium, for example, through precipitation on carrier materials such as alumina in granular form. It was found, however, that even such an improved deposition of the catalyst material is subject to the shortcomings of poor heat conductivity and lack of uniformity of temperature distribution in the catalyst body as a whole and that the earlier-mentioned shortcomings could not be completely eliminated.

A further difficulty in connection with the catalytic recombination of oxyhydrogen gas in lead-acid batteries stems from the need to eliminate, or at least reduce the poisoning of the active catalyst material through antimony hydride, acid vapors, and other substances which escape from the cells of lead-acid batteries. This makes it necessary to place additional catalyst material into the flow path of the gases. It has already been suggested to use a deposit of aluminum oxide powder with a layer of lead oxide and arrange it on a battery plug in the flow path of the gases ahead of the oxyhydrogen recombination catalyst material itself (U.S. Pat. No. 3,038,954). In this type of catalyst system, which consists of at least two differently active granular deposits of catalyst material, new problems are encountered in connection with the assembly and location of the various deposits, in order to keep them separated, short of providing separate containers for each catalyst. These difficulties are especially serious, when a compact arrangement of the deposits is necessary, as is the case when the inner catalyst consists of granular material with a layer of palladium, and the outer catalyst is likewise of granular material with a layer of lead oxide.

SUMMARY OF THE INVENTION

It is a primary objective of the present invention to provide an oxyhydrogen recombination catalyst for use in lead-acid storage batteries which does not have the above-mentioned shortcomings and which has improved heat conductivity and is easy to mount in conjunction with such storage batteries.

The invention proposes to attain the above objective by suggesting a catalyst which is in the form of a permeable coherent solid body, preferably in the shape of a rod. This catalyst body may be constituted by providing the catalyst carrier material as a porous, one-piece element, or by providing it as a homogeneous mixture of grains which are bonded together to form a rigid body carrying the active catalyst material. A preferred embodiment the invention further suggests that the catalyst body includes in its center portion an element of high heat conductivity, preferably of copper. A preferred shape of the catalyst body is a hollow cylinder whose length is a multiple of its diameter, the highly conductive copper element being arranged in the center bore of the cylinder.

The present invention further suggests a novel method of producing the catalyst body of the invention, whereby granular catalyst carrier material is worked into a paste by adding water, the past being formed into a cylindrical shape and hardened, whereupon the active catalyst material is deposited on this carrier body. The preparation of the paste may be improved by using plasticizers. The forming operation is preferably performed by an extrusion press, the extruded rods being then dried and calcinated. The depositing of the active catalyst material may be obtained by soaking the carrier body in a solution of the latter. The drying and calcination operations are preferably performed at temperatures between 120°C and 300°C. Finally, the carrier body thus obtained receives a central bore into which a copper rod can be inserted.

The present invention further suggests a device designed for use in combination with the above-mentioned oxyhydrogen recombination catalyst which includes a cylindrical gas-tight housing with a hollow stub connection and a porous plug arranged coaxially with the catalyst body on one end face thereof so as to close the housing opening. The catalyst body itself is preferably positioned inside flange-shaped extensions in the housing into which the end portions of the catalyst body are fitted, one side of the catalyst body being positioned by the housing wall itself and the other being positioned by the porous plug.

BRIEF DESCRIPTION OF THE DRAWING

Further special features and advantages of the invention will become apparent from the description following below, when taken together with the accompanying drawing which illustrates, by way of example, an embodiment of the catalyst and catalyst mounting device of the invention, represented in the various figures as follows:

FIG. 1 is a perspective view of a catalyst body;

FIG. 2 is a longitudinal cross section through the catalyst body of FIG. 1;

FIG. 3 is a longitudinal cross section through a catalyst mounting device which includes a catalyst body according to FIG. 1; and FIG. 4 is a transverse cross section through the device of FIG. 3.

DESCRIPTION OF THE PREFERRED EMBODIMENTS

The catalyst body, as illustrated in FIG. 1 of the drawing is intended for use in connection with lead-acid storage batteries which develop oxygen and hydrogen during their operation, the oxyhydrogen gas being catalytically recombined into water and the latter being returned to the electrolyte of the storage battery. The catalyst body 1 of the invention consists of a catalyst carrier material, preferably alumina, and of an active catalyst material, preferably palladium, and has a rod-shaped, regular cylindrical outline. The length of the catalyst body 1 is preferably a multiple of its diameter. Inside the longitudinal center bore 2 of rod 1 is tightly fitted a copper rod 3.

The method of producing the catalyst body of the invention involves the production of a paste consisting of alumina, potash water-glass, quartz powder and water, shaping of the paste into a cylindrical carrier body, and drying and calcining of that body. Following is an exemplary listing of ingredients which may be used for the production of such a catalyst body:

| | |
|---|---|
| Alumina | 20 gr |
| Potash water-glass solution (1.25 gr/cc) | 10 gr |
| Quartz powder | 20 gr |
| Water | 6 gr |
| Drying temperature | 120°C |
| Calcining temperature | 300°C |

On this cylindrical catalyst carrier can now be deposited the palladium catalyst material, by soaking the catalyst carrier in a mixture containing a 1-percent solution of palladium chloride and a water-hydrochloric acid mixture. This is followed by the drying operation at 120°C and by the step of calcining which involves the exposure of the catalyst element to a stream of hydrogen gas at a temperature of approximately 300°C. This results in the reduction of the palladium chloride in a hydrogen stream of 300°C. In the foregoing embodiment, the potash water-glass acts as a plasticizing agent. The catalyst body obtained in this manner has physico-chemical characteristics which are regular and homogeneous over its entire cross section and length. These favorable characteristics were born out in comparative tests between the catalyst body of the invention and a catalyst of the conventional type in the form of a package of catalyst carrier grains. The catalyst body of the invention was 4 mm in diameter and approximately 20 mm long and was compared as to its reactive capacity to similarly composed packages of granular catalyst carrier material. The granular material was obtained by crushing a cylindrical catalyst carrier of the invention and by fractioning the debris by means of suitable screens to obtain a grain size between 0.75 and 1.00 mm. The relative reactivity of the catalysts in question was measured by subjecting the package-type catalyst and the rod catalyst to a stoichiometric mixture of hydrogen and oxygen gas and by observing the speed of reaction startup following different periods of storage in an atmosphere of nearly 100 percent humidity at room temperature. The testing apparatus was an electrolysis cell with platinum electrodes, the electrolyte being a weak sulphuric acid solution. Through the cell opening on the upper side of the cell were inserted two glass tubes, with a tightly fitting stopper sealing the opening and positioning the glass tubes. These tubes were so arranged that one of them communicated with the electrolyte, the other end of the tube leading to a reaction chamber in the form of a third glass tube. The second glass tube communicated with the gas space inside the cell above the electrolyte, its other end leading from above into the same third glass tube. All connections were made gas-tight. The test procedure itself was as follows:

Into the cylindrical reaction chamber constituted by the third glass tube was introduced the test catalyst of granular consistency, the grains being held in a package by means of a wire screen of 5 mm diameter, 20 mm length, and 0.5 mm wire thickness. This screen container thus held a catalyst package of 4 mm in diameter and 20 mm length and corresponding to the one-piece catalyst body of the present invention for comparison purposes. The catalyst body of the invention, 4 mm in diameter and 20 mm long, was similarly arranged inside the reaction chamber, but without the wire screen.

The test was performed by applying an electric current of 3 amps to the electrolysis cell. This current produces a gas mixture of 1.26 liters of hydrogen and 0.63 liters of oxygen per hour under normal conditions (760 mm Hg, 20°C). This oxyhydrogen gas mixture was recombined to water by the test catalysts, the reaction being exothermic, i.e. developing heat. Provisions were made to measure the temperature at the center of the granular package as well as at the inside of the rod-shaped one-piece catalyst of the invention. A thermoelement was used for this purpose. The reaction quality of the catalyst was determined as a ratio between the temperature and the speed of reaction in terms of starting point and rate of increase.

The test procedure as described above lasted for 1 hour, whereupon the electric current was stopped. The water condensate deposited on the walls of the test apparatus as a result of the recombination of the oxyhydrogen gas would very quickly raise the relative humidity inside the test apparatus to near 100 percent. The test catalysts were maintained in this atmosphere for up to 3000 hours in a regular spacing. Following this waiting period, the test procedure was again repeated.

The test results obtained showed that the cylindrical catalyst bodies of the invention are superior to the granular catalysts in terms of reaction startup, and that they are comparable to the latter in terms of the rate of reaction increase.

Similar comparative tests performed with catalyst bodies of 70 mm length indicated that with cylindrical coherent catalyst bodies, as suggested by this invention, a substantially even temperature distribution over the entire length is obtained. It was also discovered that, even in cases where the contact between the oxyhydrogen gas mixture was uneven in regard to the catalyst surface, a very good temperature distribution was obtained. The latter test condition was achieved by connecting the second glass tube to the reaction chamber in a lateral arrangement and by approaching the tube discharge opening closely to the test body. It was found that the temperature distribution can be further improved under the above-mentioned conditions, by providing a center bore inside the catalyst body 1 and by positioning in that bore a core element of highly heat-conductive material such as copper.

Comparative longevity tests conducted with catalysts of the granular package-type and with catalysts according to the invention showed improved results for the one-piece catalysts. These tests were performed by introducing into the above testing apparatus test catalysts of 70 mm length, the granular cylindrical package-type catalysts being compared to one-piece catalysts containing a copper rod core. Both catalyst versions were subjected to the oxyhydrogen gas produced by the application of a three-amp current to the test cell. The test operation lasted in each case 8 hours, followed by 16 hours of rest. The reaction startup and the rate of reaction increase were recorded by means of a thermoelement. It was found that the granular package type catalyst changed its characteristics with an increasing number of cycles much more quickly than the one-piece catalyst of the invention with its copper core.

For instance, it was found that after 50 or more cycles of the above test procedure, the granular prior art catalyst showed its first gas-responsive temperature increase indicative of the reaction startup after 20 seconds, compared to 8 seconds at the beginning of the longevity test. This progressive deterioration of the reaction startup in the case of package-type catalysts represents a considerable disadvantage and is indicative of an unsatisfactory longevity. Comparable tests with the catalyst body of the invention produced far better results, namely a delay of 7 seconds with a newly introduced catalyst body, which lengthened to 10 seconds after 50 or more operative cycles.

From the above tests it can be concluded that a cylindrical, coherent catalyst body with a core of highly heat-conductive material, as suggested by the present invention, represents an improvement over the prior-art granular catalyst, especially as regards the heat distribution under irregular contact between the oxyhydrogen gas and the catalyst surface. It also implies that the sensitivity to an atmosphere of high humidity is reduced, and that the longevity of the catalyst is enhanced. An additional advantage offered by the invention relates to the production of the catalyst, inasmuch as it is more economical to produce one-piece catalysts according to the proposed method, as compared to the prior art fractioned, granular catalyst carrier package. The invention offers a still further advantage by suggesting a device for use in combination with the one-piece catalyst in conjunction with lead-acid storage batteries. Such a device is illustrated in FIGS. 3 and 4 of the drawing and its structural details are as follows:

FIGS. 3 and 4 of the drawing illustrate an oxyhydrogen recombination device comprising the catalyst body of the invention. The device consists essentially of an elongated housing 4 of plastic material, the housing having a substantially rectangular cross section with a rounded upper portion and with inclined bottom surfaces which form a funnel toward a centrally arranged hollow stub connection 5. On one of the two small sides of housing 4 is arranged an opening 6 through which the catalyst body 1 can be inserted into the housing, the opening 6 being closable by a porous plug 7 which is received inside a tubular wall extension 8. A similar tubular wall extension 9, but without the central opening therethrough, is arranged at the opposite small end of housing 4, the two end portions of the catalyst body 1 being lodged inside the tubular extensions 8 and 9.

The porous plug 9 consists of a ceramic mass which has been rendered hydrophobic by a known method. The inside of housing 4 thus constitutes a gas-tight reaction chamber for the catalyst body 1 which is optimally suited for the recombination of the oxygen and hydrogen gases generated by the operation of a lead-acid storage battery. The water obtained as a result of this exothermic reaction collects on the funnel-shaped bottom of housing 4 and flows through the stub connection 5 back into the battery.

It should be understood, of course, that the foregoing disclosure describes only preferred embodiments of the invention and that it is intended to cover all changes and modifications of the examples of the invention which fall within the scope of the appended claims.

What is claimed is:

1. A unitary catalyst element for catalytically recombining into water a gas mixture of oxygen and hydrogen formed during operation of a lead-acid storage battery, comprising a single elongated catalyst carrier body in the form of a permeable coherent solid; an active metallic catalyst material of the platinum group carried on the surface of the permeable catalyst carrier body; and an axially disposed core member of highly heat conductive material enclosed within said catalyst carrier body.

2. A unitary catalyst element as defined by claim 1, wherein said active metallic catalyst material comprises palladium.

3. A unitary catalyst element as defined by claim 1, wherein said catalyst carrier body comprises alumina.

4. A unitary catalyst element as defined by claim 1, wherein said catalyst carrier body comprises a granular base material bonded together to form a coherent solid.

5. A unitary catalyst element as defined by claim 1, wherein said catalyst carrier body comprises a cylindrical rod having a hollow longitudinal center bore and said core member of highly heat conductive material comprises a metallic rod tightly fitted within said bore.

6. A unitary catalyst element as defined by claim 5, wherein said metallic rod is a copper rod.

7. A method for fabricating a unitary catalyst element for catalytically reconverting into water a gas mixture of hydrogen and oxygen resulting from operation of a lead-acid storage batter, comprising the steps of:
- admixing water with a granular catalyst carrier material to form a paste;
- shaping said paste into a three-dimensional form of elongated configuration;
- drying the shaped carrier material;
- providing said elongated form with a longitudinally disposed central core of a highly heat conductive metallic material; and
- applying an active metallic catalyst material of the platinum group to the surface of said catalyst carrier material.

8. A method for fabricating a unitary catalyst element as defined by claim 7, wherein said step of providing said elongated form with a core of highly heat conductive material comprises providing said elongated form with a centrally disposed hollow bore and inserting into said bore a rod of metallic material.

* * * * *